United States Patent Office 2,967,172
Patented Jan. 3, 1961

2,967,172

CATALYZED EPOXY COATINGS AND ARTICLES COATED THEREWITH

Everett D. Hood, St. Louis, Mo., assignor to The Glidden Company, Cleveland, Ohio, a corporation of Ohio No Drawing. Filed Nov. 2, 1955, Ser. No. 544,838

10 Claims. (Cl. 260—47)

This invention relates to pigmented and clear coating compositions having epoxy resin(s) as the principal film-forming component therein and modified with polyfunctional amine catalysts and styrene oxide.

The use of polyfunctional amines as curing catalysts for epoxy resins has heretofore been practiced, but various difficulties or shortcomings have been observed therein. Where the amine catalyst is a liquid of low viscosity (as most of the useful amines are), I have found that the air-dried film in which it is used soon exhibits a thin film on its surface which is composed mainly, if not entirely, of catalyst. This film is objectionable in numerous respects. It is not only unsightly, but since various polyfunctional amines which are used as catalysts are toxic, the film represents a health hazard. Moreover, the film represents wasted catalyst and indicates that a lesser amount of the moderately-expensive material could be used in curing the film if its efficiency could be improved. In the course of efforts to prevent the formation of the catalyst film or bloom, I found unexpectedly that all of the foregoing disadvantages could be corrected by pre-reacting the catalyst with limited amounts of epoxy resin(s) in the presence of solvent and without heating, and then adding the reacted product to the mass of epoxy resins which is to be cured. I also found that by so reacting the catalyst, faster set and better low temperature cures can unexpectedly be secured. This improved pre-reacted amine-epoxy resin catalyst is described and claimed in my copending application Ser. No. 529,339, filed August 18, 1955, now abandoned, of which this application is a continuation-in-part.

In accordance with the present invention, styrene oxide is introduced in small amounts into amine-catalyzed epoxy resin coatings to further improve the coatings in respect to through-hardening, abrasion resistance, hydrocarbon-solvent resistance, resistance to yellowing of the films on curing and/or aging, and to impart other benefits. The styrene oxide is preferably used in conjunction with pre-reacted amine-epoxy resin catalyst solutions of the types claimed in my said copending application, and can if desired be made a part of said prereacted catalyst solutions.

Accordingly, it is an object of this invention to incorporate small amounts of styrene oxide in polyfunctional-amine-catalyzed epoxy resin coating compositions.

It is another object to provide an improved polyfunctional-amine catalyst which includes styrene oxide in sufficient quantity to provide the entire small amount of styrene oxide which is desired in the epoxy resin when catalyzed with said catalyst.

These and other objects will be understood from the following description of the invention.

The epoxy resins which are the subject of my invention are complex polymeric, resinous polyether derivatives of polyhydric phenols and preferably are glycidyl ethers obtained by reacting dihydric phenols with polyfunctional halohydrins, said derivatives being free of functional groups other than epoxy and hydroxyl groups, having alternating aromatic and aliphatic nuclei united through ether oxygens and having terminal 1, 2 epoxy groups. The dihydric and/or polyhydric phenols and polyfunctional halohydrins are reacted in manners and proportions well understood in the art (for example, Greenlee Patent No. 2,521,911, here incorporated by reference) so as to form a complex resin of the type described above. Epichlorhydrin and glycerol dichlorhydrin are examples of polyfunctional halohydrins, while resorcinol and "bis-phenol" are examples of dihydric phenols useful in forming such epoxide resins. "Bis-phenols" may be prepared by methods such as are described in U.S. Patent No. 2,182,308 using phenol and various ketones having up to 6 carbons in each chain attached to the keto group.

The complex epoxide resins contemplated for use in my invention may have a wide range of functionality due to the relative proportions of epoxy and hydroxyl groups in the molecule. Excellent coating compositions can be prepared in accordance with the invention by employing "bis-phenol"-epichlorhydrin resins having an epoxide equivalent of from 210 to 4000, corresponding to an hydroxyl equivalent of 80 to 200. It is known that the epoxy equivalent weight or the epoxy-plus-hydroxyl equivalent weight of any complex epoxide resin such as described above may be related somewhat to the "$n$" value of the formula which theoretically expresses the general chemical nature of the resins resulting from condensation of a polyhydric phenol with epichlorhydrin. Such a formula is:

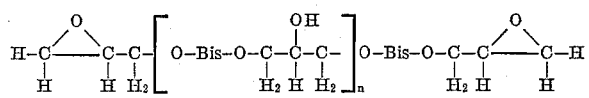

where —O-Bis-O— represents a dihydric phenolic residue such as the "bis-phenol" residue:

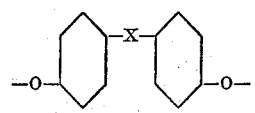

wherein X is the hydrocarbon residue of any cyclic ketone of up to 6 carbons, inclusive, or is the group

in which R represents any alkyl, aryl or alicyclic group having up to 6 carbons and R' represents any alkyl group of up to 6 carbons, inclusive. The "$n$" value of the epichlorhydrin-"bis-phenol" condensate may vary from about 0 to about 7 in resins which I have found to be satisfactory for use in preparing my compositions, but I prefer "$n$" values between 0 and about 3. Various complex epoxy resins of the types described above are currently available as commercial products under the tradename of "Epon Resins" (Shell Chemicals Company) and Araldite Epoxy Resins (Ciba Company) and are supplied by Shell with information concerning their epoxy and epoxy-plus-hydroxyl equivalents. The "Epon" (or equivalent Araldite Epoxy resins) referred to hereinafter in the examples are the reaction products of epichlorhydrin and 4,4'-dihydroxy-diphenyl-2,2-propane.

While any of the epoxy resins described hereinabove can be used for or in the main mass of coating which is to be cured, or used for pre-reaction with the polyfunctional amine(s), those having an epoxy equivalent weight between about 210 and 4000 are preferred. The commercially-available Shell "Epon" resins Nos. 864, 1001, 1004 and 1007 and the Ciba Araldite Resins 6060 and 6070 are especially preferred. Epoxy resins having an epoxy equivalent weight lower than about 210 yield films having inferior solvent resistance, but where this property is relatively immaterial in the use of the film, then such resins can be beneficially cured by practicing the invention described herein.

The polyfunctional amines employed in preparing my curing catalysts are organic amines containing two —NH₂ groups separated from each other by at least two carbons, of which diethylene triamine, triethylene tetramine, 1:3 diaminobutane, 1:2 diamino propane (propylene diamine), ethylene diamine, paraphenylene diamine, benzidine, dimethylaminopropylamine, diethylaminopropylamine, dibutylaminopropylamine and iminobispropylamine are typical examples. Such amines and/or others are used individually or in any desired combinations in relatively small amounts (about .03–.3 mol per molar epoxy equivalent of epoxy resin(s) in the coating which is to be cured. This proportion corresponds in general to about 3–15% of amine by weight on the epoxy resin(s).

When proceeding in accordance with the invention in my copending application Serial No. 529,339, supra, it will be understood that instead of adding the amine catalysts directly to the epoxy coating composition which is to be cured as has been done in the past, I first react the selected catalyst(s) with a small amount of the same or other epoxy resin(s). While the proportions of amine to epoxy resin(s) in this reaction can be varied widely, I prefer to use weight ratios between 2:1 and 1:10. If the ratio of amine(s) to epoxy resin(s) is greater than 2:1, the reaction product is apt to be so viscous that it is difficult to blend later on with the main mass of epoxy coating compositions.

The styrene oxide content which is to be present in the epoxy resin in accordance with the present invention can be introduced into either the polyfunctional amine-catalyst component or into the epoxy resin component. In the latter instance, the amount of styrene oxide will be at least about 6% by weight on the epoxy resin solids and can amount to as much as about 30%. I prefer about 12–15%. At least about 6% has been found to be necessary to impart to the cured resins useful levels of resistance to hydrocarbon solvents. Where such resistance is not a matter of importance in a particular coating use, then lower amounts of styrene oxide can be employed to secure other benefits. Currently, however, epoxy resin coatings of the types involved in this invention are finding use in aircraft where resistance to hydraulic fluid, motor oil and hydrocarbon solvents is a matter of appreciable significance. For such uses of the cured coatings, I prefer to have present at least 6% of styrene oxide whether the coating is clear or pigmented. A common aircraft test for satisfactory resistance to hydrocarbons involves immersion of coated panels for 720 hours in a hydrocarbon test fluid conforming to type 3 of Federal Specification MIL–H–3136. Individual aircraft concerns usually also require a similar test using lubricating oil conforming to Federal Specification MIL–L–7808, and/or diester jet lubricants. Failure of a coating in such tests is evidenced by softening of the film.

Abrasion resistance is also a significant quality sought in air craft coatings. Such resistance is conventionally measured on the well-known Taber Abraser machine by weighing a coated panel before and after exposure to say 100 cycles of the abrasion wheels of the machine. The loss of weight indicates abrasion resistance of the film, lower losses indicating higher resistance.

Through-hardening of a coating film is, of course, an important quality of any coating composition, especially air-drying coatings, and the discovery that styrene oxide imparts good through-hardening properties to amine catalyzed epoxy resins materially expands the field of usefulness of such resins in coating compositions and elsewhere. Through-hardening is measured by pencil hardness tests.

The following examples illustrate the principles and practices of this invention.

*Example 1*

A gloss white enamel was prepared from the following ingredients:

| | | |
|---|---|---|
| TiO₂ pigment | lbs | 3.75 |
| Zinc oxide pigment | do | .875 |
| Epoxy solution | pts | 4.875 |
|   Epon 1001 (Shell Chem.) | lbs | 10 |
|   Methyl isobutyl ketone | pts | 4 |
|   Ethyleneglycol monobutyl ether | do | .375 |
|   Toluol | do | 3.311 |
| Styrene oxide (100% solids) | do | .500 |
| Methyl isobutyl ketone | do | 1.125 |
| Toluol | do | 1.50 |
| Beetle Resin 216–8 (American Cyanamid; phenol-aldehyde resin) | liq. ozs | 2 |

These ingredients were mixed and then ground on a roller mill to give an enamel grind.

For application by spraying, the enamel was reduced 4:1 with a catalyst reducer prepared from the following ingredients:

| | Pints |
|---|---|
| Diethylene triamine | .75 |
| Butanol | 1.5 |
| Ethyleneglycol monobutyl ether | 1.75 |
| Xylol | 3.0 |
| Methyl isobutyl ketone | .25 |

After mixing these materials together one then adds .75 pint of the "Epoxy solution" identified in the foregoing enamel formulation.

After the catalyst reducer has been added to the enamel, an induction period of about 1.5 hours is allowed before the reduced enamel is sprayed. After being sprayed, the catalyzed coating air-dries in about 2 hours sufficiently to be handled and thereafter continues to cure to its maximum hardness. The catalyzed enamel has a pot life of about 16 hours after the induction period. The enamel is especially suitable for use as an exterior coating on metals, such as aluminum, anodized aluminum, primed steel, etc.

*Example 2*

For the purpose of evaluating abrasion resistance imparted by styrene oxide, two formulations were prepared which differed only in that the styrene oxide of one was replaced with epoxy-resin solution in the other. The formulations employed were as follows:

| | | Styrene Oxide, Formula A | Formula B |
|---|---|---|---|
| Aluminum pigment | lbs | .5 | .5 |
| Epoxy resin solution | pts | 4.875 | 5.375 |
|   Epon 1001 Resin—10 lbs. | | | |
|   Diacetone alcohol—4 pts. | | | |
|   Ethyleneglycol methyl ether—4 pts. | | | |
| Xylol | pts | 1.375 | 1.375 |
| Methyl isobutyl ketone | pts | 1.24 | 1.25 |
| Beetle Resin 216–8 | liq. oz. | 4 | 4 |
| Styrene Oxide | pts | 0.50 | none |

These enamels were mixed and were then reduced 8:1 for spraying with a catalyst reducer prepared from the following materials:

| | | |
|---|---|---|
| Diethyleine triamine | pts | 1.5 |
| Butanol | do | 2.5 |
| Xylol | do | 2.5 |

Mix above, then add:

| | | |
|---|---|---|
| Epoxy resin solution | pts | 1.5 |
|   Epon 1001 | lbs | 10 |
|   Diacetone alcohol | pts | 4 |
|   Ethylene glycol monobutyl ether | do | .375 |
|   Toluol | do | 3.11 |

An induction period of 1.5 hours was allowed before spraying after adding the catalyst reducer.

Panels were sprayed with each of Formulas A and B and the sprayed panels were then air-dried for 8 days to ensure maximum curing. The panels were then tested for abrasion resistance on a Taber Abraser using a 17 CS wheel.

| Formula | Mg. Loss per 100 Cycles |
|---|---|
| A | 13.2 |
| B | 36.2 |

The panels were tested for hydrocarbon resistance by measuring pencil hardness of the films after exposure to the following hydrocarbons:

| Formula | Type III Thinner MIL-H-3136 | Diester Lubricant | Lub. Oil MIL-L-7808 |
|---|---|---|---|
| A | 2H | 2H | 2H |
| B | H | H | H |

Example 3

For purposes of evaluating resistance to discoloration imparted by styrene oxide, two formulations were prepared so as to be alike except that the styrene oxide content of one was replaced with epoxy resin solution. The two formulations were as follows:

| | Styrene Oxide, Formula C | Formula D |
|---|---|---|
| TiO₂ pigment _____lbs__ | 3.75 | 3.75 |
| Zinc oxide _____lbs__ | .75 | .75 |
| Aluminum stearate _____lbs__ | .06 | .06 |
| Epoxy resin solution of Ex. 2 ___pts__ | 4.875 | 5.375 |
| Methyl isobutyl ketone _____pts__ | 1.25 | 1.25 |
| Xylol _____pts__ | 1.375 | 1.375 |
| Beetle Resin 216-8 _____liq. oz__ | 4 | 4 |
| Styrene Oxide _____pts__ | 0.50 | none |

These white enamels, after being ground, were reduced 8:1 with the catalyst reducer of Example 1 and after an induction period of 1.5 hours were sprayed on steel panels. The panels were then air-dried for 24 hours after which they were baked at the times and temperatures noted below. The amount of discoloration resulting from such baking is also indicated.

| Formula | 16 hours at 250° F. | 16 hours at 300° F. | 16 hours at 350° F. |
|---|---|---|---|
| C (styrene oxide) | Extremely slight yellowing. | Very slight yellowing. | Moderate yellowing. |
| D | Moderate yellowing. | Moderate yellowing. | Bad yellowing. |

Styrene oxide is presently available commercially in moderately high purity, and in the foregoing examples the styrene oxide there referred to was such commercial product. The supplier (Dow Chemical Company) lists the following average analysis for the product:

| | Percent |
|---|---|
| Chlorine | .02 |
| Water | .056 |
| Unsaturation (as styrene) | .015 |
| Acidity (as benzoic acid) | .02 |
| Carbonyl (as phenylacetaldehyde, by infrared absorption) | .03 |
| Styrene oxide | Balance |

Example 4

Example 1 was repeated except that the styrene oxide was withheld from the white enamel formulation and was added to the catalyst reducer formulation. The resulting cured film was found to exhibit properties substantially identical with those indicated in Example 1.

Example 5

When Example 2 was repeated except for withholding the styrene oxide from Formula A and adding it to the reducer catalyst employed in Formula A, analogous properties were found in the resulting film in comparison with Formula B.

Example 6

When Example 3 was repeated except to withhold the styrene oxide from Formula C and to add it to the reducer catalyst used with Formula C, substantially identical properties were secured.

As previously noted, my compositions can be prepared as clear coatings or can be pigmented with conventional pigments, fillers, etc. to give flat, semi-gloss or gloss coatings. While the coatings, whether pigmented or clear, are especially useful where air-dried protective films are desired, the coatings can also be hardened by baking, if desired. When baked, however, slower acting amine catalysts such as dibutylaminopropylamine, diethylaminopropylamine, dimethylaminopropylamine or iminobispropylamine can be used. The air-dried or baked films provide durable protective coatings and can be used as exposed films on a variety of substrates, such as wood, metal, and plastics (e.g., unsaturated polyester resins, phenol-aldehyde resins, etc.). Where the coatings are applied to wood or plastics, a polyamide-epoxy resin primer is advantageous. Such a primer, as prepared in accordance with U.S. Patents No. 2,707,708 (with or without formaldehyde modification), improves the adhesion between plastic substrates and the top coat and prevents penetration of wood substrates.

It should be noted that zinc chromate pigment reacts with the aliphatic amine catalysts and can prevent the expected curing of a catalyzed coating which contains such pigment. Iron blue pigment, when present in sizeable amounts, can cause precipitation of epoxy resin. Small amounts are not harmful, however, and can be used successfully.

Having now described my invention, what I claim is:

1. A liquid catalyst adapted for use in promoting the air-drying, through-hardening, abrasion-resistance, hydrocarbon-solvent resistance and resistance to yellowing of solvent-thinned amine-curable epoxy resin coating compositions when added to the latter to supply between about 3% and 15% of polyfunctional amine and concurrently from about 6% to 30% of styrene oxide, both being by weight on the total epoxy resin in said catalyzed compositions, said catalyst being a homogeneous organic solvent solution of (1) at least one reaction product of: (A) polyfunctional organic amine containing two —NH₂ groups separated from each other by at least two carbon atoms, and (B) resinous polymeric glycidyl ethers of polyhydric phenols having alternating aromatic and aliphatic nuclei united through ether oxygen, having terminal 1,2 epoxy groups, and being free of functional groups other than epoxy and hydroxyl groups; said reaction product having been prepared by mixing said A and said B components together in compatible solvents without extraneous heating and in proportions such that the weight ratio of the A component to the B component is about 2:1 and 1:10; and (2) styrene oxide in an amount such that the weight ratio of styrene oxide to polyfunctional amine is between about 0.4 and 10 to 1.

2. A liquid catalyst as claimed in claim 1 where said B component has an epoxy equivalent weight between about 210 and 4000 and wherein the weight ratio of styrene oxide to polyfunctional amine is about 2 to 1.

3. A liquid catalyst as claimed in claim 2 wherein the B component is a condensation product of a dihydric phenol and epichlorhydrin having the general formula

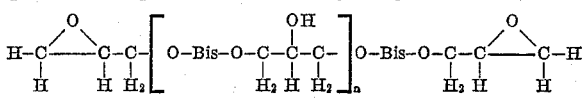

wherein —O-Bis-O— represents the divalent radical derived from 4,4'-dihydroxy-diphenyl-2,2-propane by removal of the hydrogens of the hydroxyl groups, and wherein "$n$" has a value between 0 and 7.

4. A liquid catalyst as claimed in claim 3 wherein the B component has an epoxy equivalent weight between about 210 and 4000.

5. A metal article having an exposed air-dried, protective film at a surface thereof, said film having been formed by applying to a surface of said metal article and air-drying thereon a film of liquid, solvent-thinned coating composition whose vehicle consists essentially of: (A) the organic solvents employed to thin said composition; (B) epoxy resin as the principal film-forming material of said vehicle, said epoxy resin being a resinous, polymeric, glycidyl ether of polyhydric phenols having alternating aromatic and aliphatic nuclei united together through ether oxygen, having terminal 1,2 epoxy groups, and being free of functional groups other than hydroxyl and epoxy groups; (C) at least one reaction product of (D) polyfunctional organic amine containing two —NH$_2$ separated from each other by at least two carbon atoms and (E) resinous polymeric glycidyl ethers of polyhydric phenols having alternating aromatic and aliphatic nuclei united through ether oxygen, having terminal 1,2 epoxy groups, and being free of functional groups other than epoxy and hydroxyl groups, said reaction product having been prepared by mixing said (D) and (E) components together in compatible organic solvents without extraneous heating and in proportions such that the weight ratio of the (D) component to the (E) component is between about 2:1 and 1:10; said reaction product (C) being present in said vehicle in amounts which provide about 3–15% of said polyfunctional amine, by weight, based on the weight of said principal film-forming epoxy resin plus the weight of epoxy resin in said reaction product; and (F) about 6–30% of styrene oxide by weight, based on the weight of said principal film-forming epoxy resin plus the weight of epoxy resin in said reaction product; said air dried coating being characterized by improved through-hardening, improved abrasion resistance, improved hydrocarbon resistance and improved resistance to yellowing as compared to a similar air-dried coating of an otherwise identical coating composition from which said styrene oxide has been omitted.

6. A metal article as claimed in claim 5 wherein the epoxy resins of said organic solvent solution and of said reaction product (C) have an epoxy equivalent weight between about 210 and 4000, and wherein the styrene oxide amounts to 12–15%.

7. A metal article as claimed in claim 6 wherein the epoxy resins of said organic solvent solution and of said reaction product (C) are condensation products of a dihydric phenol and epichlorhydrin having the general formula:

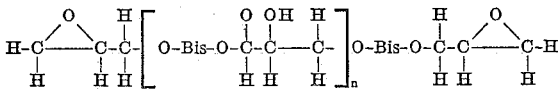

wherein —O-Bis-O— represents the divalent radical derived from 4,4'-dihydroxy-diphenyl-2,2 propane by removal of the hydrogens of the hydroxyl groups, and wherein "$n$" has a value between 0 and 7.

8. A metal article as claimed in claim 7 wherein "$n$" has a value between 0 and 3.

9. A metal article as claimed in claim 7 wherein said coating composition includes pigment dispersed in said vehicle.

10. A metal article as claimed in claim 5 wherein said reaction product (C) and said styrene oxide (F) are introduced into said coating composition in the form of a liquid catalyst as claimed in claim 1.

References Cited in the file of this patent

UNITED STATES PATENTS

| | | |
|---|---|---|
| 2,528,932 | Wiles et al. | Nov. 7, 1950 |
| 2,594,979 | Nelson | Apr. 29, 1952 |
| 2,651,589 | Shokal et al. | Sept. 8, 1953 |

UNITED STATES PATENT OFFICE
CERTIFICATION OF CORRECTION

Patent No. 2,967,172                          January 3, 1961

Everett D. Hood

It is hereby certified that error appears in the above numbered patent requiring correction and that the said Letters Patent should read as corrected below.

Column 4, line 64, for "Diethyleine" read -- Diethylene --; column 8, lines 16 to 20, for that portion of the formula reading

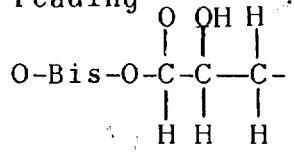      read      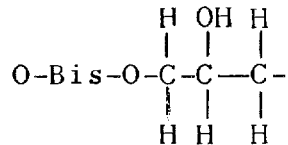

Signed and sealed this 20th day of June 1961.

Attest:

ERNEST W. SWIDER                                    DAVID L. LADD
Attesting Officer                                          Commissioner of Patents